US012633038B2

(12) United States Patent
Fang et al.

(10) Patent No.: US 12,633,038 B2
(45) Date of Patent: May 19, 2026

(54) SYSTEMS AND METHODS FOR GENERATING AN IMAGE USING INTERPOLATION OF FEATURES

(71) Applicant: Toyota Research Institute, Inc., Los Altos, CA (US)

(72) Inventors: Jiading Fang, Chicago, IL (US); Vitor Guizilini, Santa Clara, CA (US); Igor Vasiljevic, San Mateo, CA (US); Rares A. Ambrus, San Francisco, CA (US); Gregory Shakhnarovich, Chicago, IL (US); Matthew R. Walter, Chicago, IL (US); Adrien David Gaidon, Mountain View, CA (US)

(73) Assignees: Toyota Research Institute, Inc., Los Altos, CA (US); Toyota Jidosha Kabuhiki Kaisha, Toyota (JP); Toyota Technological Institute at Chicago, Chicago, IL (US)

( * ) Notice: Subject to any disclaimer, the term of this patent is extended or adjusted under 35 U.S.C. 154(b) by 259 days.

(21) Appl. No.: 18/127,949

(22) Filed: Mar. 29, 2023

(65) Prior Publication Data

US 2024/0331268 A1     Oct. 3, 2024

(51) Int. Cl.
    *G06T 15/08*      (2011.01)
    *G06N 5/022*      (2023.01)
         (Continued)

(52) U.S. Cl.
    CPC .............. *G06T 15/08* (2013.01); *G06N 5/022* (2013.01); *G06T 15/06* (2013.01); *G06T 15/503* (2013.01);
         (Continued)

(58) Field of Classification Search
    CPC ....... G06T 15/08; G06T 15/06; G06T 15/503; G06T 2210/21; G06T 2210/56; G06N 5/022; G06N 3/045; G06N 3/08
         (Continued)

(56) References Cited

U.S. PATENT DOCUMENTS 6,184,894 B1    2/2001   Rosman et al.
10,861,213 B1 *   12/2020   Holzer ...................... G06T 5/70
         (Continued)

FOREIGN PATENT DOCUMENTS

CN       104183013 B   *   2/2018

OTHER PUBLICATIONS

Li et al., "MINE: Towards Continuous Depth MPI with NeRF for Novel View Synthesis," Proceedings of the IEEE/CVF International Conference on Computer Vision (ICCV), 2021, pp. 12578-12588.

(Continued)

*Primary Examiner* — Sheree N Brown
(74) *Attorney, Agent, or Firm* — Christopher G. Darrow; Darrow Mustafa PC

(57) ABSTRACT

System, methods, and other embodiments described herein relate to generating an image by interpolating features estimated from a learning model. In one embodiment, a method includes sampling three-dimensional (3D) points of a light ray that crosses a frustum space associated with a single-view camera, the 3D points reflecting depth estimates derived from data that the single-view camera generates for a scene. The method also includes deriving feature values for the 3D points using tri-linear interpolation across feature planes of the frustum space, the feature planes being estimated by a learning model. The method also includes inferring an image in two dimensions (2D) by translating the feature values and compositing the data with volumetric (Continued)

rendering for the scene. The method also includes executing a control task by a controller using the image.

20 Claims, 5 Drawing Sheets

(51) Int. Cl.
  *G06T 15/06* (2011.01)
  *G06T 15/50* (2011.01)
(52) U.S. Cl.
  CPC ...... *G06T 2210/21* (2013.01); *G06T 2210/56* (2013.01)
(58) Field of Classification Search
  USPC .......................................................... 345/424
  See application file for complete search history.

(56) References Cited

U.S. PATENT DOCUMENTS

| | | | | |
|---|---|---|---|---|
| 10,991,156 | B2 * | 4/2021 | Chiu .................... | G06F 18/251 |
| 11,080,590 | B2 * | 8/2021 | Smolyanskiy ......... | G06N 3/063 |
| 11,093,780 | B2 * | 8/2021 | Yoo ........................ | G06V 10/82 |
| 11,341,719 | B2 * | 5/2022 | Guizilini ................... | G06T 7/50 |
| 11,537,139 | B2 * | 12/2022 | Rankawat .............. | G06V 10/82 |
| 11,648,945 | B2 * | 5/2023 | Sajjadi ................. | G08G 1/0125 |
| | | | | 382/104 |
| 11,698,272 | B2 * | 7/2023 | Kroepfl .............. | G01C 21/3841 |
| | | | | 701/409 |
| 11,783,541 | B2 * | 10/2023 | Guizilini ................ | G06N 3/006 |
| | | | | 345/419 |
| 12,039,663 | B2 * | 7/2024 | Wang .................... | B60W 30/09 |
| 12,190,448 | B2 * | 1/2025 | Wang ..................... | G06V 20/56 |
| 12,412,324 | B2 * | 9/2025 | Chen ......................... | G06T 5/50 |
| 12,470,681 | B2 * | 11/2025 | Sabater ................ | H04N 19/597 |
| 2016/0125572 | A1 * | 5/2016 | Yoo ........................ | G06V 10/82 |
| | | | | 382/157 |
| 2019/0311487 | A1 * | 10/2019 | Xiao ........................ | G01S 17/89 |
| 2020/0155105 | A1 | 5/2020 | Mandelkern et al. | |
| 2020/0184718 | A1 * | 6/2020 | Chiu ......................... | G06T 7/20 |
| 2021/0350616 | A1 * | 11/2021 | Guizilini .............. | G06N 3/0895 |
| 2021/0407039 | A1 | 12/2021 | De et al. | |
| 2022/0262068 | A1 * | 8/2022 | Guizilini .............. | G06N 3/0455 |
| 2023/0215108 | A1 * | 7/2023 | Peri ......................... | G06T 15/08 |
| 2023/0394823 | A1 * | 12/2023 | Weng .............. | B60W 60/00276 |
| 2023/0419610 | A1 * | 12/2023 | Liu ......................... | G06V 10/60 |
| 2024/0070961 | A1 * | 2/2024 | Livesley .............. | G06T 15/005 |
| 2024/0098235 | A1 * | 3/2024 | Sabater .................. | G06N 3/045 |
| 2024/0202532 | A1 * | 6/2024 | Salah ................... | G06N 3/0464 |
| 2024/0257460 | A1 * | 8/2024 | Lin .......................... | G06N 3/08 |
| 2024/0371081 | A1 * | 11/2024 | Matthews .............. | G06T 15/20 |

OTHER PUBLICATIONS

Han et al., "Single-View View Synthesis in the Wild with Learned Adaptive Multiplane Images," ACM SIGGRAPH 2022 Conference Proceedings, pp. 1-11.

Yu et al., "pixelNeRF: Neural Radiance Fields from One or Few Images," Proceedings of the IEEE/CVF Conference on Computer Vision and Pattern Recognition (CVPR), 2021, pp. 4578-4587.

Ramesh et al., "Hierarchical Text-Conditional Image Generation with CLIP Latents," arXiv:2204.06125v1, Apr. 13, 2022, pp. 1-27.

Wu et al., "NUWA-Infinity: Autoregressive over Autoregressive Generation for Infinite Visual Synthesis," arXiv:2207.09814v2, Aug. 12, 2022, pp. 1-23.

Chen et al., "Aug-NeRF: Training Stronger Neural Radiance Fields with Triple-Level Physically-Grounded Augmentations," Proceedings of the IEEE/CVF Conference on Computer Vision and Pattern Recognition (CVPR), 2022, pp. 15191-15202.

Zachariadis et al., "Accelerating B-spline Interpolation on GPUs: Application to Medical Image Registration," Computer Methods and Programs in Biomedicine, vol. 193, Sep. 2020, pp. 1-13.

Zheng et al., "Looking for the Devil in the Details: Learning Trilinear Attention Sampling Network for Fine-grained Image Recognition," Proceedings of the IEEE/CVF Conference on Computer Vision and Pattern Recognition (CVPR), 2019, pp. 5012-5021.

Yang et al., "Interpolation-Aware Padding for 3D Sparse Convolutional Neural Networks," Proceedings of the IEEE/CVF International Conference on Computer Vision (ICCV), 2021, pp. 7467-7475.

* cited by examiner

SYSTEMS AND METHODS FOR GENERATING AN IMAGE USING INTERPOLATION OF FEATURES

TECHNICAL FIELD

The subject matter described herein relates, in general, to generating an image, and, more particularly, to generating an image by interpolating features estimated from a learning model.

BACKGROUND

Systems synthesize camera data to generate images for various applications. The synthesis may include generating an image for a target view. Correspondingly, a subsystem can execute a task (e.g., trigger an alarm) according to objects visible within the target view. For example, a vehicle uses camera data to form an image at a target view about a surrounding environment from which a system derives awareness about aspects of the surrounding environment. This image is useful in various circumstances for improving perceptions of the surrounding environment so that systems such as automated driving systems can accurately plan and navigate around objects accordingly. However, a system may be unable to generate an image for certain views that lack explicit camera data.

In various implementations, systems process data from a single-view camera through multi-plane representations to generate an image for a target view. However, an image generated from a single snapshot through multi-plane processing can include unwanted artifacts and blurriness for the target view. In particular, systems can lose depth data used for synthesizing an area within the image for the target view because the multi-plane processing uses discretely separated planes. As a result, tasks performed by other systems become less reliable from the diminished smoothness and clarity when using these synthesized images.

SUMMARY

In one embodiment, example systems and methods relate to generating an image by interpolating features estimated from a learning model. In various implementations, systems are unable to generate an image for a target view using data acquired from a single-view camera because of limitations in processing techniques and a field-of-view. For example, techniques lose depth information during processing causing a reduction in clarity for image areas at the target view. In one approach, systems use a multi-plane image (MPI) to generate clear images for various views by interpolating data points. However, MPI also suffers from losing information when decomposing image data into two-dimensional (2D) planes by interpolating.

Therefore, in one embodiment, a prediction system tri-linearly interpolates sampled points between frustum planes from image data for generating a 2D image to overcome the noted difficulties. Here, tri-linear interpolation involves estimating values for three-dimensional (3D) points among and between adjacent planes, thereby reducing information loss and increasing representation for certain areas. In one approach, the adjacent planes are feature planes estimated by a learning model having details about notable areas within the image data. Correspondingly, the prediction system derives feature values for the 3D points using tri-linear interpolation across the feature planes. In this way, the prediction system can expand MPI capacity by increasing the representation of dense areas within a scene for the target view using the feature values. Regarding image generation, the prediction system estimates an image in 2D by translating the feature values with increased clarity using the expanded information details. Thus, the prediction system increases smoothness and clarity for the target view, thereby improving the reliability of downstream tasks relying on clear images.

In one embodiment, a prediction system for generating an image by interpolating features estimated from a learning model is disclosed. The prediction system includes a memory including instructions that, when executed by a processor, cause the processor to sample 3D points of a light ray that crosses a frustum space associated with a single-view camera, the 3D points reflecting depth estimates derived from data that the single-view camera generates for a scene. The instructions also include instructions to derive feature values for the 3D points using tri-linear interpolation across feature planes of the frustum space, the feature planes being estimated by a learning model. The instructions also include instructions to infer an image in 2D by translating the feature values and compositing the data with volumetric rendering for the scene. The instructions also include instructions to execute a control task by a controller using the image.

In one embodiment, a non-transitory computer-readable medium for generating an image by interpolating features estimated from a learning model and including instructions, that when executed by a processor, cause the processor to perform one or more functions is disclosed. The instructions include instructions to sample 3D points of a light ray that crosses a frustum space associated with a single-view camera, the 3D points reflecting depth estimates derived from data that the single-view camera generates for a scene. The instructions also include instructions to derive feature values for the 3D points using tri-linear interpolation across feature planes of the frustum space, the feature planes being estimated by a learning model. The instructions also include instructions to infer an image in 2D by translating the feature values and compositing the data with volumetric rendering for the scene. The instructions also include instructions to execute a control task by a controller using the image.

In one embodiment, a method for generating an image by interpolating features estimated from a learning model is disclosed. In one embodiment, the method includes sampling 3D points of a light ray that crosses a frustum space associated with a single-view camera, the 3D points reflecting depth estimates derived from data that the single-view camera generates for a scene. The method also includes deriving feature values for the 3D points using tri-linear interpolation across feature planes of the frustum space, the feature planes being estimated by a learning model. The method also includes inferring an image in 2D by translating the feature values and compositing the data with volumetric rendering for the scene. The method also includes executing a control task by a controller using the image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with generating an image by interpolating features estimated from a learning model are disclosed herein. In various implementations, systems using a single-view camera can generate unclear images during interpolation from a limited field-of-view and insufficient processing capabilities. Furthermore, systems using a multi-plane image (MPI) with a single camera suffer from reduced radiance for certain views. For example, MPI systems using bi-linear interpolation sample a light ray at intersections of neighboring planes for a frustum space associated with a camera. This limits sampling for the light ray, especially when a target view angle is substantial and intersection points are limited by given MPI planes. In one approach, MPI systems interpolate a value for the intersecting point in a red-green-blue (RGB) sigma space (e.g., mixing surrounding colors) and alpha space (e.g., mixing surrounding opacity). This operation can also limit the representation of light power during interpolation because interpolation functions are linear, thereby reducing image clarity.

Therefore, in one embodiment, a prediction system implements tri-linear interpolation for sampling three-dimensional (3D) points using arbitrary depth within a frustum space, thereby removing sampling limits to plane-intersections. This allows the prediction system to adaptively sample and draw processing capacity towards notable regions within a scene (e.g., a target depth). In this way, applications can more accurately execute tasks from clearer images of a target view associated with a single camera. Regarding interpolation details, the prediction system tri-linearly interpolates points of a light ray crossing through and between feature planes estimated by a learning model (e.g., a neural network) and derives feature values. Here, the tri-linear interpolation expands the information density of the MPI through increased sampling rates and feature planes, especially at key areas within the scene.

In various implementations, the prediction system infers an image by translating the feature values and compositing camera data through volumetric rendering for the scene. In this way, the image has richer color, smoother depth, and increased clarity since the feature values enhance details that benefit image rendering. Regarding applications, a control system (e.g., an automated driving system) can execute complex tasks with the image more reliably through these enhancements without substantial computation costs. Therefore, the prediction system increases clearness and depth for the target view, thereby improving the reliability of downstream tasks relying on higher-quality and denser images.

Figure 1:
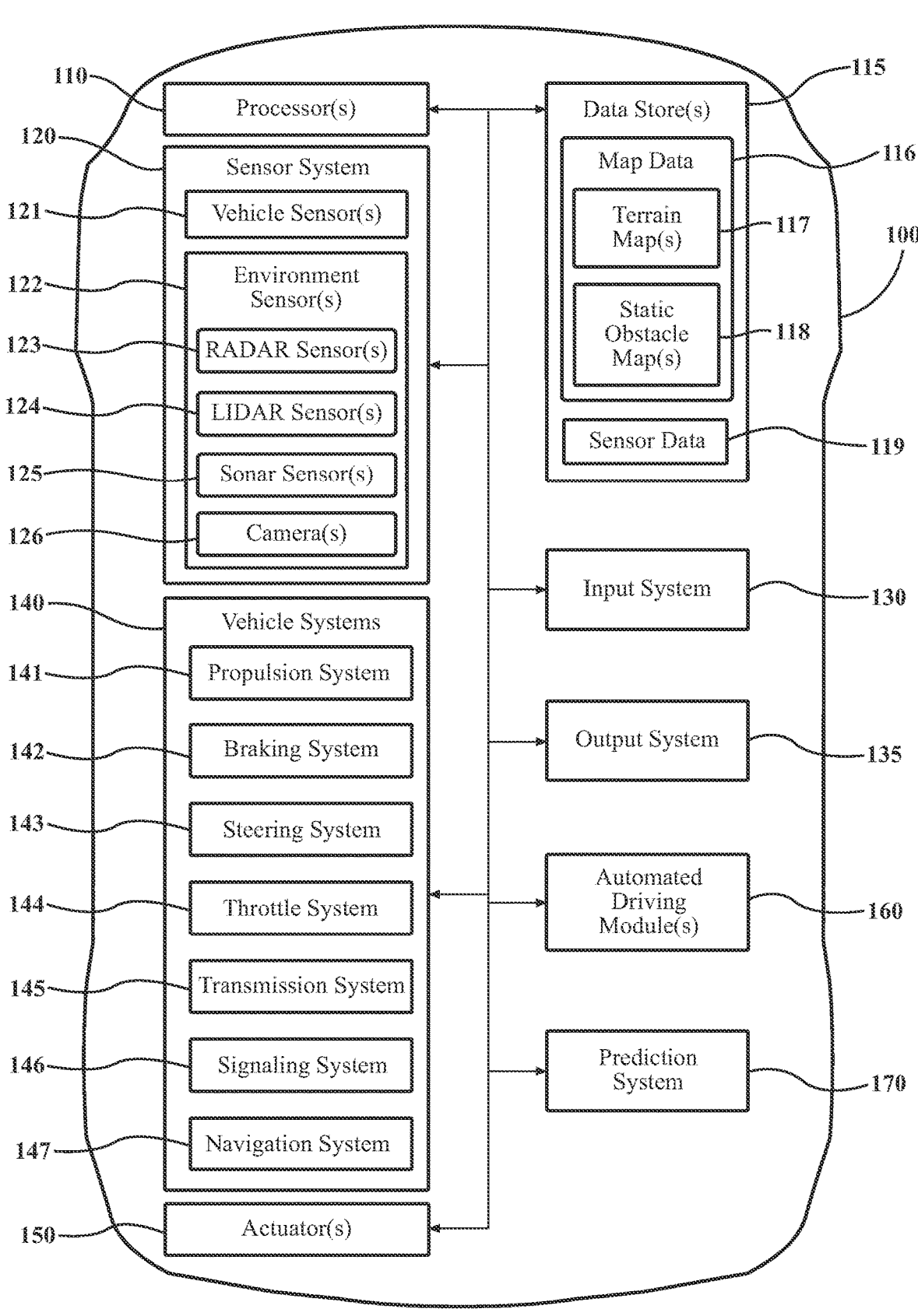
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a prediction system 170 uses road-side units (RSU), consumer electronics (CE), mobile devices, robots, drones, and so on that benefit from the functionality discussed herein associated with generating an image by interpolating features estimated from a learning model.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to generating an image by interpolating features estimated from a learning model.

Figure 2:
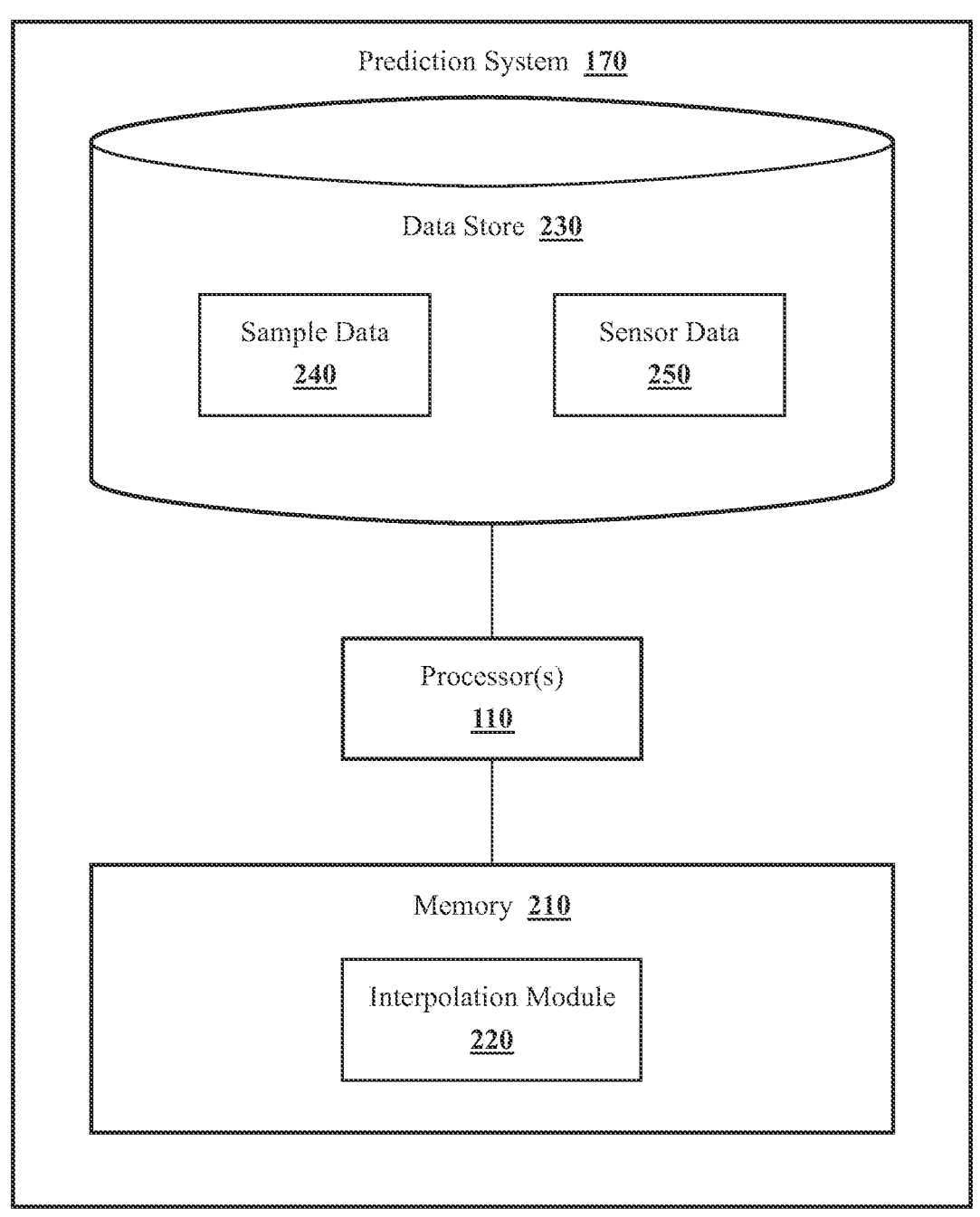
FIG. 2 illustrates one embodiment of a prediction system that is associated with generating an image by interpolating features estimated from a learning model.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores an interpolation module 220. The memory 210 is a random-access memory (RAM), a read-only memory (ROM), a hard-disk drive, a flash memory, or other suitable memory for storing the interpolation module 220. The interpolation module 220 is, for example, computer-readable instructions that when executed by the processor(s) 110 causes the processor(s) 110 to perform the various functions disclosed herein.

The prediction system 170 as illustrated in FIG. 2 is generally an abstracted form of the prediction system 170. Furthermore, the interpolation module 220 may include instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the interpolation module 220, in one embodiment, acquires the sensor data 250 that includes data from a camera (e.g., a single-view camera, a monocular camera, etc.). The interpolation module 220 can also control the respective sensors to provide the data inputs in the form of the sensor data 250. In further arrangements, the interpolation module 220 processes the sample data 240 derived from camera data.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the interpolation module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the sample data 240 having values for 3D points of a light ray. For example, the 3D points are values associated with a light ray crossing planes in a frustum space associated with a camera. As explained below, the 3D points may reflect depth estimates derived from data that the camera generates for a scene and a target view using a physical model (e.g., a geometric-depth model).

Still referring to FIG. 2, the interpolation module 220, in one embodiment, is further configured to perform additional tasks beyond controlling the respective sensors to acquire and provide the sensor data 250. For example, the interpolation module 220 includes instructions that cause the processor(s) 110 to execute tri-linear interpolation with MPI processes for overcoming the aforementioned limits of bi-linear interpolation. In this way, the prediction system 170 derives information for additional grid points (e.g., eight) from neighboring planes for a light ray, thereby expanding imaging bandwidth.

In various implementations, the prediction system 170 samples and derives 3D points of a light ray that crosses a frustum space associated with a camera (e.g., a single-view camera, a monocular camera, etc.). Here, the 3D points reflect depth estimates derived from data that the camera generates for a scene. A frustum space may be a cone or pyramid remaining after cutting off an upper part by a plane parallel to a base. For a camera, a frustum may represent a view from various distances of the camera as a pyramid-shaped volume. Objects within the frustum are visible to the camera, whereas objects outside the frustum may be cut off. The interpolation module 220 may derive feature values for the 3D points using tri-linear interpolation across feature planes of the frustum space. In one approach, feature planes have estimated classifications (e.g., person, vehicle, etc.), descriptions, and so on about different areas within a scene. As explained below, the feature planes can be estimated by a learning model that extracts information about notable areas within a scene for a target view. For instance, notable areas are regions in a scene having dense color information, obstacles, anomalies, and so on.

Regarding tri-linear interpolation, certain aspects are associated with bi-linear functions. Consider, in one approach, the value produced by a bi-linear interpolation $q_{bi}$ from the i-th ray of the source camera with direction $d_{tgt,\,i}$ and the j-th MPI plane being given as:

$$q_{bi}(d_{tgt,i},p_j)=b_{(q_{00},q_{01},q_{10},q_{11})}(\{x,y\}_{i,j}). \qquad \text{Equation (1)}$$

Here, $x_{i,j}$ is the pixel coordinate of the intersection point of i-th target ray and j-th MPI plane. The values $q_{00}$, $q_{01}$, $q_{10}$, $q_{11}$ are four neighboring pixel point values of $(x, y)_{i,j}$. Furthermore, b is the bi-linear interpolation function with values on four corners of a 2D grid. This approach may upper bound samples for each ray by $N_{samples} \leq N_{planes}$. As such, tri-linear interpolation in MPI-based approaches instead interpolates sampled points up to or above eight neighboring grid points associated with two neighboring planes for a target ray. In this way, the prediction system 170 increases information for notable areas (e.g., denser areas, disparate areas, etc.) of a scene without significant complexity.

Tri-linear interpolation overcomes sampling restrictions by ray-plane intersections through various approaches. An outcome is that sampling becomes a function of a target view direction $d_{tgt,i}$ and the traveled distance of the sampled point along the ray rather than a target plane. Consider, the prediction system 170 computes the depth of the point in source plane $t=Z_{src}$ with physical modeling through applying Equation (2) as:

$$q_{tri}(d_{tgt,i},t)=l_{(z_{up} \neq bottom)}(b_{(q_{000},q_{100},q_{010},q_{110})} \\ (\{x,y\}_{up}),b_{(q_{001},q_{101},q_{011},q_{111})}(\{x,y\}_{bottom}))(Z_{i,t}). \qquad \text{Equation (2)}$$

Here, $(X, Y, Z)_{i,t}$ is the 3D coordinate parameterized by i-th target ray and distance parameter t. The values $q_{000}$, $q_{100}$, $q_{010}$, $q_{110}$, $q_{001}$, $q_{101}$, $q_{011}$, $q_{111}$ are the eight neighboring points on the closest up and bottom planes and b is the bi-linear function from Equation (1). The operation l is a linear interpolation function for respective planes. Furthermore, planes may be fixed according to parameters (e.g., lens size) of the source camera. Fixed planes can reduce complexity by deriving limited sample points (e.g., 1000) for a target distance (e.g., up to 10 meters (m)) of a light ray. Still, the prediction system 170 derives additional information about the scene for various target depths through tri-linear interpolation among and between fixed planes.

Since tri-linear interpolation may be performed on the frustum instead of a cubic 3D grid, the prediction system 170 processes X, Y coordinates of a light ray. For X, Y the resolution representation for a plane can be similar and constructed by extending a frustum. In one approach, the intersecting 2D pixel coordinates on the up and bottom plane by a light ray shooting from a camera center are related. They also may have similar coordinates when projecting associated 3D points using a camera intrinsics matrix. As such, Equation (3) makes the following association:

$$\{x,y\}_{up}=\{x,y\}_{bottom} \approx K(X,Y,Z)_{i,t}. \qquad \text{Equation (3)}$$

Here, K is the camera intrinsics matrix and $\approx$ is equality after converting the homogeneous coordinate. The interpolation module 220 may interpolate Z coordinates linearly from the Z values of the up and bottom planes. Thus, the linear interpolation function is parametrized by $Z_{up}$, $Z_{bottom}$ as:

$$l_{(z_{up},z_{bottom})}.$$

Equation (4)

Figure 3A:
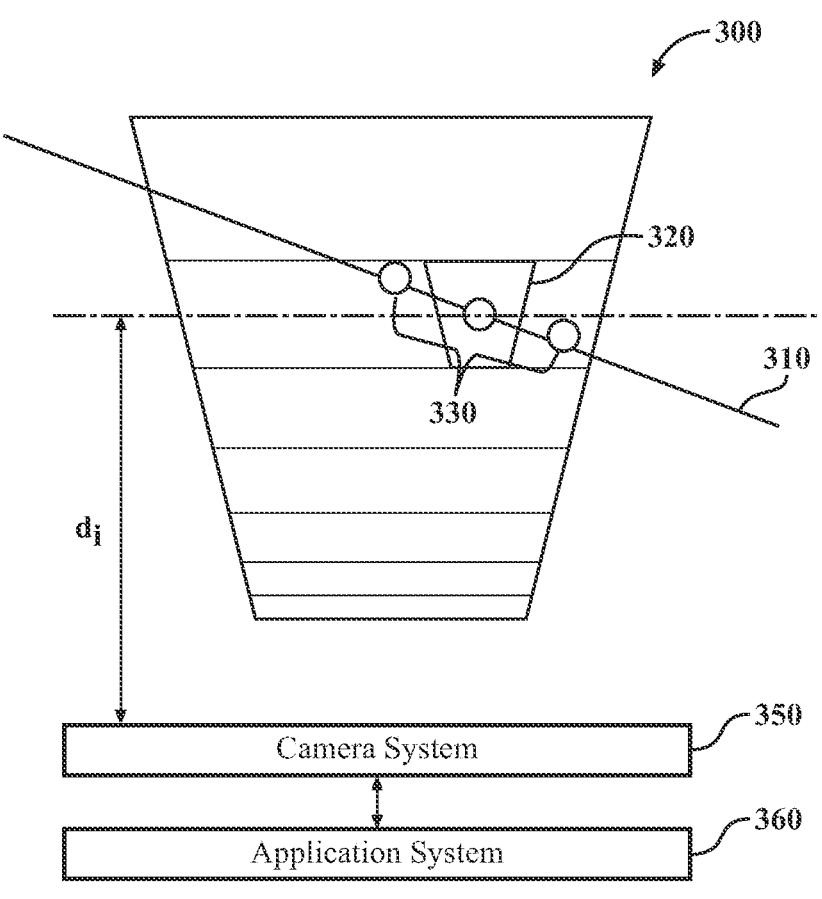
FIGS. 3A and 3B illustrate using a camera system that executes tri-linear interpolation of a light ray.
Figure 3B:
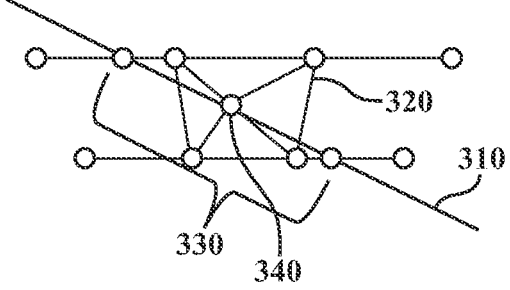

FIGS. 3A and 3B illustrate using a camera system that executes tri-linear interpolation of a light ray. In 300, the prediction system 170 gathers rich and dense information about light ray 310, particularly compared to bi-linear interpolation, allowing $N_{samples} \geq N_{planes}$. In particular, the prediction system 170 derives deeper details at a depth di for a target view from a source camera by interpolating the points 330 between and among planes. Here, the MPI slices views into planes having sparse intensity or limited color information of a light ray along various distances. As explained below, the prediction system 170 adaptively samples the MPI slices to identify denser areas within a scene efficiently through tri-linear interpolation.

In one approach, the tri-linear interpolation involves using up to or above eight grid points 340, thereby supplying additional depth and nuanced information about an area between frustum planes. Furthermore, the tri-linear interpolation allows adaptive point sampling without the restriction of ray-plane intersection associated with other MPI processes such that certain scene areas gamer more attention. For example, adjacent planes for a scene area have a density disparity representing a sudden increase in radiance density between MPI planes associated with the light ray. In this way, the prediction system 170 generates finer details for areas demanding attention (e.g., an obstacle-filled area) and coarser details of other areas within a scene, thereby optimizing processing capacity. Accordingly, the prediction system 170 adaptively increases sampling in these areas, thereby expanding the information capacity of MPI.

Moreover, the frustum 320 may be associated with camera system 350 that detects the light ray 310. For example, the light ray 310 is processed to form an image about a target view (e.g., an intersection) from a driving environment. The prediction system 170 may process signals from the camera system 350 and outputs an image (e.g., a 2D image). The application system 360 can use the image to execute various tasks. In one approach, the application system 360 coordinates with the automated driving module(s) 160 to execute a control task by a controller that alters braking for the vehicle 100. The automated driving module(s) 160 implements the control task more reliably using expanded information about the target view.

In various implementations, the prediction system 170 uses a machine learning model to generate an image using MPI. The interpolation module 220 can process RGB values (e.g., radiance and wavelength) on each grid point for a plane associated with the frustum 320 and source camera. However, interpolating using an RGB space for certain views can render images that are overly smooth. This is especially likely in signal-sparse regions for the target view. As such, the prediction system 170 projecting to a feature space having additional dimensionality and interpolating in the feature space improves the performance of MPI. In one approach, the interpolation module 220 uses a machine learning algorithm, such as a convolutional neural network (CNN), to derive values from feature planes instead of depth alone through RGB planes. Of course, in further aspects, the interpolation module 220 may employ different machine learning algorithms or implements different approaches for performing the associated functions, which can include deep convolutional encoder-decoder architectures, or another suitable approach that generates information about separate object classes represented in the image. Whichever particular approach the interpolation module 220 implements, the prediction system 170 infers images having improved representations of a target view through tri-linear interpolation among feature planes. In particular, the prediction system 170 derives a feature on each plane for the MPI-based representations.

Regarding feature planes, the prediction system 170 derives a feature vector (e.g., 16 dim length) and directly interpolates among and between planes in a feature space rather than predicting the $RGB_\sigma$ sigma value. A multi-layer perceptron (MLP) associated with the volumetric rendering may subsequently map feature values of 3D points to a $RGB_\sigma$ space. As such, the difference of the traditional $RGB_\sigma$ version and the featurized version may be:

$$q_{RGB_\sigma} = \text{interp}(RGB_\sigma).$$

Equation (5)

$$q_{RGB_\sigma} = \text{MLP}(\text{interp}(\text{feature})).$$

Equation (6)

This operation may involve generating a MPI by mixing information among and between the feature planes using the tri-linear interpolation. In this way, the MPI expands the capacity for target views particularly at denser areas having elevated light power or mixed colors. Furthermore, the prediction system 170 infers an image in 2D by translating the feature values and compositing other camera data with the volumetric rendering.

In addition to the tri-linear interpolation previously described, the prediction system 170 may implement a Pytorch function for sampling data from a camera. Pytorch processes the data and grid values as arguments. Here, the interpolation module 220 uses the data for interpolation operations while the grid forms the organization of normalized coordinates for an input structure. Furthermore, the prediction system 170 adjusts normalized z coordinates when depth planes in MPI involve linear sampling within a disparity space as follows:

$$z\_norm = 2 * \left(1 - \left(\frac{\frac{1}{z} - \frac{1}{depth\_max}}{\left(\frac{1}{depth\_min} - \frac{1}{depth\_max}\right)}\right)\right) - 1.$$

Equation (7)

Here, depth_max and depth_min represent distances relative to a camera source for adjacent frustum planes. For sampling points along a light ray, the prediction system 170 processes a per-pixel source depth map as an input and calculates homography. The calculation for various plane depths may be:

$$[x_s, y_s, 1]^T \sim K\left(R - \frac{tn^T}{z_i}\right)K^{-1}[x_t, y_t, 1]^T.$$

Equation (8)

In Equation (8), $x_s$, $y_s$ are pixel coordinates in the source frame, $x_t$, $y_t$ are pixel coordinates in the target frame. Furthermore, K is the intrinsics matrix, R is the rotation matrix, t is the translation vector, n the normal vector, and z is the depth.

As previously explained, in various implementations, the prediction system 170 derives feature values by executing tri-linear interpolation among and between feature planes rather than utilizing RGB planes. For example, the prediction system 170 expands an interpolation tensor in 3D from [B, 4, H, W] to [B, 16, H, W]. Here, B is the batch number, H is the image height, and W is the image width. The prediction system 170 can subsequently use a 2-layer NN for regressing to [B, 4, H, W] and executing subsequent radiance calculations. Furthermore, this approach may involve generating a MPI by mixing information among and between the feature planes using the tri-linear interpolation. In this way, the MPI expands the capacity for target views particularly at denser areas having elevated light power or mixed colors. Furthermore, the prediction system 170 infers an image in 2D by translating the feature values from 3D points and compositing other camera data through volumetric rendering.

Figure 4:
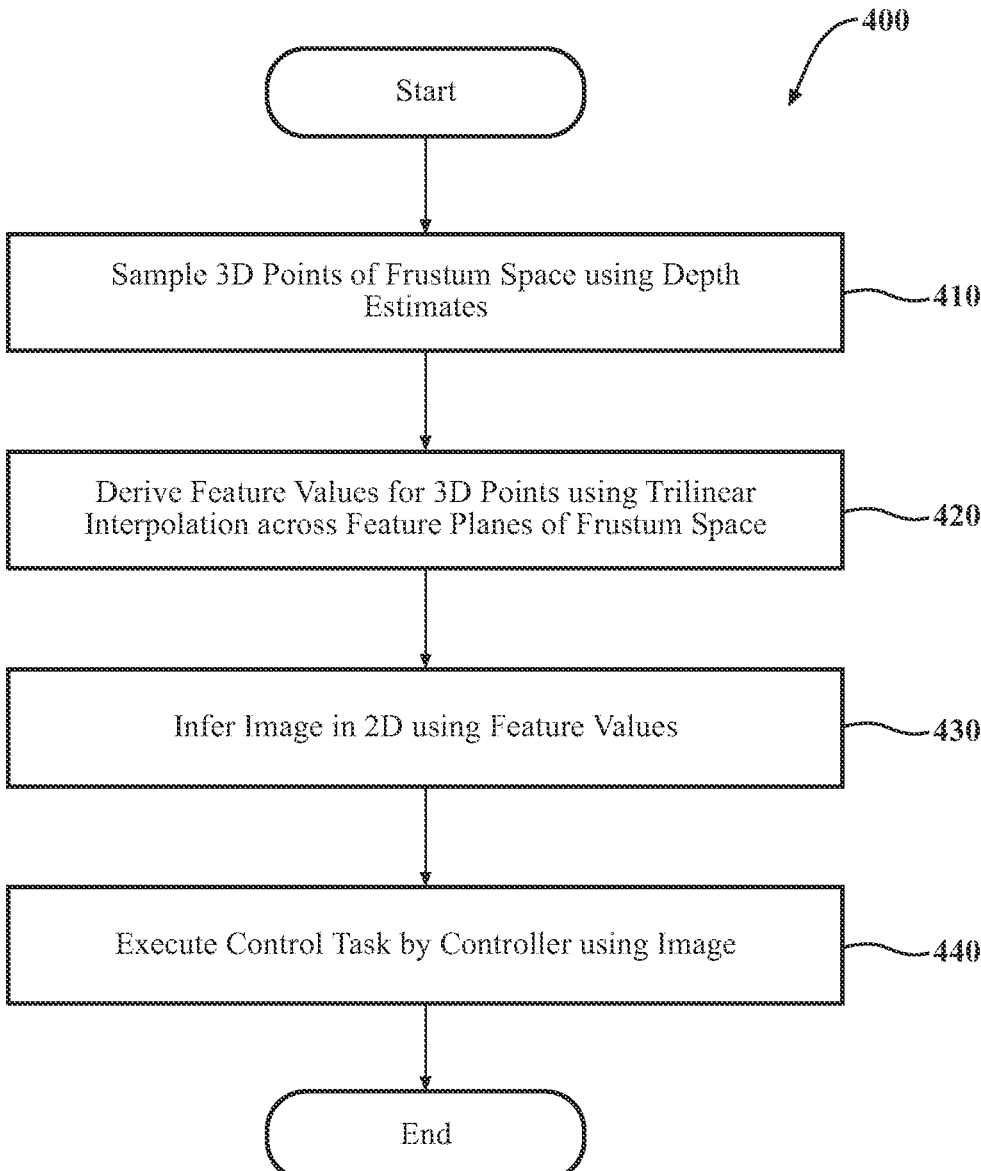
FIG. 4 illustrates a flowchart for one embodiment of a method that infers an image by deriving feature values of three-dimensional (3D) points from a light ray using tri-linear interpolation.

Now referring to FIG. 4, a flowchart of a method 400 that is associated with generating an image by interpolating features estimated from a learning model is disclosed. Method 400 will be discussed from the perspective of the prediction system 170 of FIGS. 1 and 2. While method 400 is discussed in combination with the prediction system 170, it should be appreciated that the method 400 is not limited to being implemented within the prediction system 170 but is instead one example of a system that may implement the method 400.

At 410, the prediction system 170 samples 3D points for a light ray from a scene using depth estimates. The 3D points can be associated with a frustum space of a source camera (e.g., a single-view camera, a monocular camera, etc.). For example, the prediction system 170 implements a physical model for sampling and deriving 3D points among a light ray crossing frustum planes for a target view direction and arbitrary distances. When combined with tri-linear interpolation, the sampling removes limits to plane-intersections and allows $N_{samples} \geq N_{planes}$. As previously explained, this approach also allows the prediction system 170 to sample adaptively by drawing processing capacity towards demanding regions within a scene (e.g., a target depth) rather than a target plane. In one approach, tri-linear interpolation with MPI interpolates these sampled points for up to or above eight grid points from two neighboring planes associated with a target depth. In this way, the prediction system 170 increases information for target areas of a scene without significant complexity.

At 420, the prediction system 170 and the interpolation module 220 derive feature values for the 3D points using tri-linear interpolation across feature planes of the frustum space. Here, the prediction system 170 estimates the feature planes using a learning model (e.g., a NN model). The feature values may include classes (e.g., person, vehicle, etc.) describing objects within the scene at various depths. These feature values may be derived from information extracted when forming the feature planes. For example, a deep convolutional encoder-decoder model generates information about separate object classes represented in data from the source camera relative to the frustum 320. This allows the prediction system 170 to direct processing capacity towards notable areas and depths for the tri-linear interpolation. For example, the prediction system 170 derives a feature vector (e.g., 16 dim length) and directly interpolates among and between planes in a feature space to estimate values. Furthermore, notable areas may be regions in a scene having dense color information, obstacles, anomalies, and so on.

In one approach, the prediction system 170 derives the feature values by generating a MPI to acquire information among and between the feature planes using the tri-linear interpolation. In particular, the mixing involves acquiring the information such that regions within a scene attract computational attention according to a density disparity. For example, the density disparity represents a sudden increase in radiance density between the feature planes associated with a light ray and a target view.

At 430, the prediction system 170 infers an image in 2D by translating the feature values and compositing camera data with volumetric rendering for the scene. For example, a MLP associated with the volumetric rendering maps the feature values of the 3D points to a $RGB_\sigma$ space. In particular, the resolution representation for a plane can be similar and constructed by extending a frustum. In one approach, the intersecting 2D pixel coordinates on the up and bottom plane by a light ray shooting from a camera center are similar. As such, they have similar coordinates when projecting the 3D point using a camera intrinsics matrix. Accordingly, the prediction system 170 increases clearness and depth for the target view in 2D through tri-linear interpolation, thereby improving the reliability of downstream tasks relying on quality images.

At 440, the prediction system 170 coordinates with a controller to execute a control task using the image inferred. For example, the controller coordinates with the automated driving module(s) 160 to execute a control task that alters longitudinal (e.g., braking) or lateral (e.g., steering) controls for the vehicle 100. Regarding improvements, the automated driving module(s) 160 implements the control task more reliably using expanded information about the target view at various depths.

Figure 5:
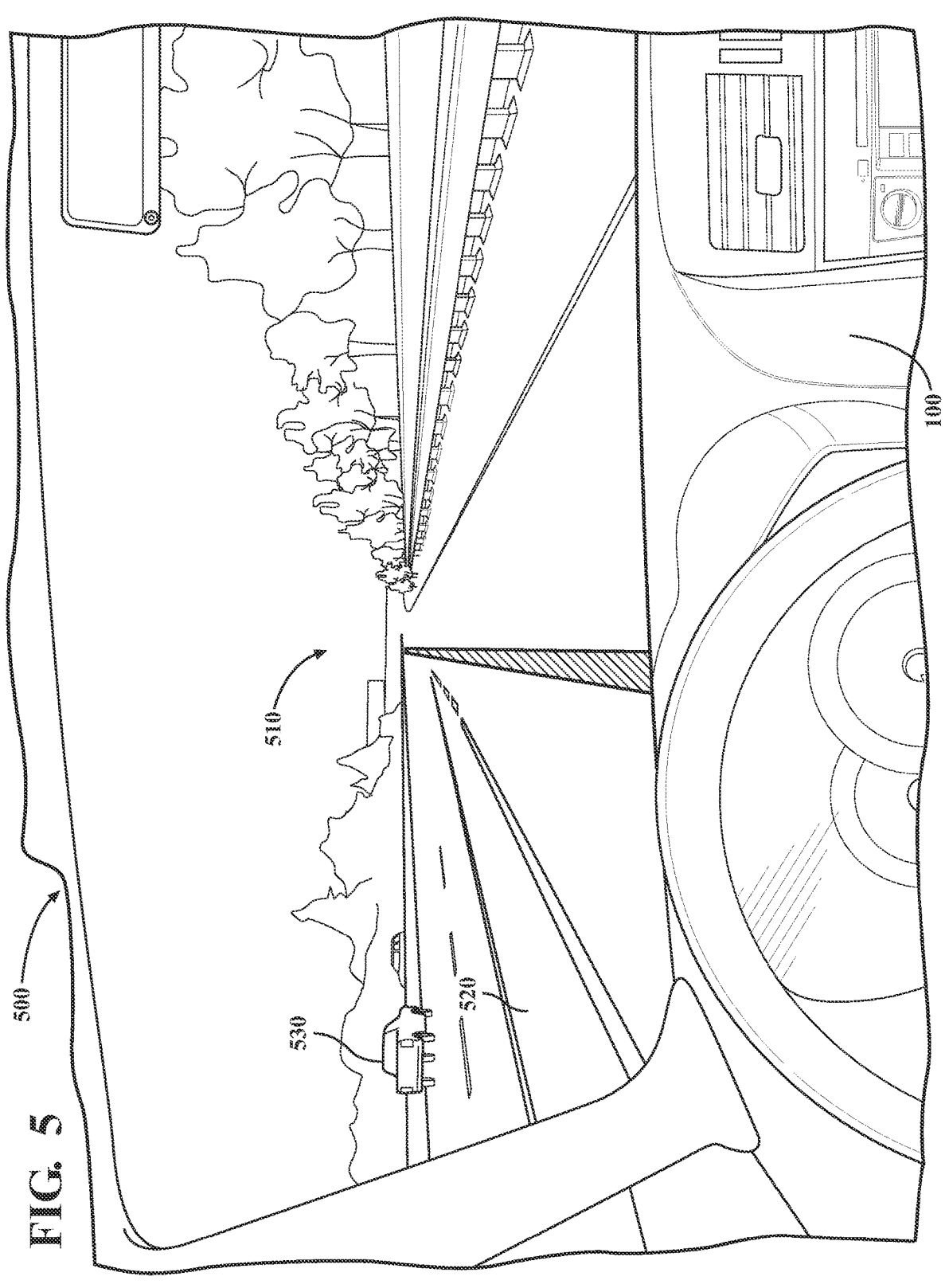
FIG. 5 illustrates an example of implementing the prediction system in a driving environment to infer an image using tri-linear interpolation and executing control tasks.

FIG. 5 illustrates an example 500 of implementing the prediction system 170 in a driving environment 510 to infer an image using tri-linear interpolation and executing control tasks. Vehicle 100 may be operating in an automated mode while driving on the road 520. A controller coordinates with the automated driving module(s) 160 to change lanes on the road 520. The controller executes a maneuver left for the vehicle 100 that avoids the truck 530 using a 2D image outputted by the prediction system 170. In particular, the vehicle 100 executes the maneuver more reliably through improved clarity and depth about the truck 530 from tri-linear interpolating camera data about a target view directed towards the truck 530. Accordingly, the prediction system 170 increases safety for the vehicle by inferring clear and richer information about the target view and the truck 530.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system comprising:
a processor; and
a memory storing instructions that, when executed by the processor, cause the processor to:
sample three-dimensional (3D) points of a light ray that crosses a frustum space associated with a single-view camera, the 3D points reflecting depth estimates derived from data that the single-view camera generates for a scene;
derive feature values for the 3D points using tri-linear interpolation;
generate an image using the tri-linear interpolation across feature planes of the frustum space with the feature values, the feature planes being estimated by a multi-layer perceptron (MLP), and the light ray is associated with generated grid points from adjacent planes within the frustum space, selective objects over the frustum space are unviewable, and the adjacent planes include a dense area within the scene having a density disparity from an increased radiance associated with deriving fine and coarse details for the feature values;
infer the image in two dimensions (2D) using the MLP by translating the feature values for the 3D points and compositing the data with a volumetric rendering for the scene, the feature values associated with one of the fine and the coarse details; and
execute a control task by a controller using the image.

2. The prediction system of claim 1, wherein the instructions to derive the feature values further include instructions to generate the image as a multi-plane image (MPI) by mixing information directly among the feature planes and between the feature planes using the tri-linear interpolation, wherein the information expands a capacity of the MPI.

3. The prediction system of claim 2, wherein the information describes denser locations within the scene for a driving environment and the denser locations represent mixed colors.

4. The prediction system of claim 2 further including instructions to acquire the data by a vehicle for a target view and wherein the MPI is associated with an area of the target view.

5. The prediction system of claim 1, wherein the instructions to derive the feature values further include instructions to generate the image as a multi-plane image (MPI) to acquire information among the feature planes and between the feature planes using the tri-linear interpolation, wherein the information describes regions within the scene that attract attention according to the density disparity.

6. The prediction system of claim 5, wherein the density disparity represents an increase in a radiance density between the feature planes associated with the light ray.

7. The prediction system of claim 5, wherein the instructions to infer the image further include instructions to map the feature values to a red-green-blue (RGB) space using the MLP associated with the volumetric rendering.

8. The prediction system of claim 1, wherein the instructions to derive the feature values further include instructions to generate at least eight grid points from the adjacent planes for the light ray associated with the frustum space and a target view; and
wherein first objects within the frustum space are visible by the single-view camera and second objects outside the frustum space are unviewable by the single-view camera.

9. The prediction system of claim 1, wherein the feature values include classes describing objects within the scene and the tri-linear interpolation acquires information about the scene from the adjacent planes of the frustum space.

10. A non-transitory computer-readable medium comprising:
instructions that when executed by a processor cause the processor to:
sample three-dimensional (3D) points of a light ray that crosses a frustum space associated with a single-view camera, the 3D points reflecting depth estimates derived from data that the single-view camera generates for a scene;
derive feature values for the 3D points using tri-linear interpolation;
generate an image using the tri-linear interpolation across feature planes of the frustum space with the feature values, the feature planes being estimated by a multi-layer perceptron (MLP), and the light ray is associated with generated grid points from adjacent planes within the frustum space, selective objects over the frustum space are unviewable, and the adjacent planes include a dense area within the scene having a density disparity from an increased radiance associated with deriving fine and coarse details for the feature values;
infer the image in two dimensions (2D) using the MLP by translating the feature values for the 3D points and compositing the data with a volumetric rendering for the scene, the feature values associated with one of the fine and the coarse details; and
execute a control task by a controller using the image.

11. The non-transitory computer-readable medium of claim 10, wherein the instructions to derive the feature values further include instructions to generate the image as a multi-plane image (MPI) by mixing information directly among the feature planes and between the feature planes using the tri-linear interpolation, wherein the information expands a capacity of the MPI.

12. A method comprising:
sampling three-dimensional (3D) points of a light ray that crosses a frustum space associated with a single-view camera, the 3D points reflecting depth estimates derived from data that the single-view camera generates for a scene;
deriving feature values for the 3D points using tri-linear interpolation;

generate an image using the tri-linear interpolation across feature planes of the frustum space with the feature values, the feature planes being estimated by a multi-layer perceptron (MLP), and the light ray is associated with generated grid points from adjacent planes within the frustum space, selective objects over the frustum space are unviewable, and the adjacent planes include a dense area within the scene having a density disparity from an increased radiance associated with deriving fine and coarse details for the feature values;

inferring the image in two dimensions (2D) using the MLP by translating the feature values for the 3D points and compositing the data with a volumetric rendering for the scene, the feature values associated with one of the fine and the coarse details; and executing a control task by a controller using the image.

13. The method of claim 12, wherein deriving the feature values further includes generating the image as a multi-plane image (MPI) by mixing information directly among the feature planes and between the feature planes using the tri-linear interpolation, wherein the information expands a capacity of the MPI.

14. The method of claim 13, wherein the information describes denser locations within the scene for a driving environment and the denser locations represent mixed colors.

15. The method of claim 13 further including acquiring the data by a vehicle for a target view and wherein the MPI is associated with an area of the target view.

16. The method of claim 12, wherein deriving the feature values further includes generating the image as a multi-plane image (MPI) to acquire information among the feature planes and between the feature planes using the tri-linear interpolation, wherein the information describes regions within the scene that attract attention according to the density disparity.

17. The method of claim 16, wherein the density disparity represents an increase in a radiance density between the feature planes associated with the light ray.

18. The method of claim 16, wherein inferring the image further includes mapping the feature values to a red-green-blue (RGB) space using the MLP associated with the volumetric rendering.

19. The method of claim 12, wherein deriving the feature values further includes generating at least eight grid points from the adjacent planes for the light ray associated with the frustum space and a target view; and wherein first objects within the frustum space are visible by the single-view camera and second objects outside the frustum space are unviewable by the single-view camera.

20. The method of claim 12, wherein the feature values include classes describing objects within the scene and the tri-linear interpolation acquires information about the scene from the adjacent planes of the frustum space.

\* \* \* \* \*